United States Patent Office 3,629,148
Patented Dec. 21, 1971

3,629,148
IRON-MODIFIED BISMUTH PHOSPHO-
MOLYBDATE CATALYST
Jurgen G. Dominik, Freeport, Tex., and Robert D. Presson, Bedford Heights, and Carl G. Wysocki, Fairview Park, Ohio, assignors to The Standard Oil Company, Cleveland, Ohio
No Drawing. Filed Sept. 24, 1969, Ser. No. 860,834
Int. Cl. B01j *11/82*
U.S. Cl. 252—437    2 Claims

ABSTRACT OF THE DISCLOSURE

The instant product is a remanufactured catalyst. Used or spent bismuth phosphomolybdate catalyst is reformulated with the addition of iron by comminuting said catalyst with sufficient water to form a paste, adding aqueous ammonium heptamolybdate solution to said paste to form a slurry, adding said slurry to a silica dispersion in water acidified with phosphoric acid, adding an iron salt in acidic solution to said slurry and homogeneously dispersing it therein to form a smooth mixture, spray-drying said mixture and calcining the spray-dried product.

BACKGROUND OF THE INVENTION

A large number of catalysts have been disclosed for the production of $\alpha$-$\beta$-monoolefinically unsaturated nitriles from monoolefins by vapor phase ammoxidation. Particularly effective catalysts are disclosed in U.S. Pats. Nos. 2,904,580 and 3,226,422. A complete description of the method of formulating the catalysts and conditions for their use are disclosed in the aforementioned patents. Though the catalysts are regenerated continuously in a fluid-bed reactor, which is a preferred apparatus for the carrying out of this reaction on a commercial scale, over an extended period of time the activity of the catalysts declines measurably. Since a conversion of 1 or 2 percent less than that normally attained is of economic significance in a commercial plant, it is desirable to substitute fresh catalyst for used, from time to time. It has been discovered that reformulating the spent catalyst to incorporate iron is of particular value.

In the instant case it would appear that, since an additional element is to be incorporated in the catalyst, it would be apparent to one skilled in the art that a water-soluble salt of the element can be mixed into the depleted catalyst, which can then be spray-dried and calcined. This procedure does not yield a useable catalyst.

It is well-known to those skilled in the art and from the disclosures of U.S. Pats. Nos. 3,044,966 and 3,341,471 that it is difficult enough to make an efficient ammoxidation catalyst starting with chemically pure ingredients in such a manner as to yield a catalyst which has the desired activity, relative stability, attrition resistance, and surface area; it is much more difficult to take a used or spent catalyst of relatively large particle size, which has already been made attrition resistant, then comminute it to the submicron range, then add an additional desirable ingredient to it, and make a catalyst which not only has all the excellent physical attributes of the original iron-free catalyst, but about one-tenth the surface area and better chemical activity as well.

Contrary to the teaching of the prior art, the desired properties of the remanufactured catalyst are not obtained if known and specified procedures are followed. For example, in U.S. Pat. No. 3,226,422 it is stated, "The active components may be deposited on the carrier in known manner, for example, by evaporating a solution of a corresponding salt, for example a nitrate, jointly with a colloidal solution, suspension or paste of the carrier material (col. 2, lines 9–13)." If the spent iron-free catalyst is regarded as a carrier, and the desired amount of the additional ingredient is deposited on it from a solution of ferric nitrate, the catalyst, after appropriate finishing steps, is a relatively "soft" catalyst with less than economic activity. In U.S. Pat. No. 2,904,580 it is stated, "The catalyst may be prepared by any of the numerous methods of catalyst preparation which are known to those skilled in the art. For example, the catalyst may be manufactured by co-gelling the various ingredients. The co-gelled mass may then be dried and ground to an appropriate size. Alternately, the co-gelled material may be slurried and spray dried in accordance with conventional techniques. The catalyst may be extruded as pellets or formed into spheres in oil as is well known in the art. Alternatively, the catalyst components may be mixed with the support in the form of the slurry followed by drying, or may be impregnated on silica or other support (col. 2, line 71 and col. 3, lines 1–11)." Co-gelled catalyst has unsatisfactory attrition resistance as does catalyst prepared by the other methods in this case.

Another approach is to incorporate the desired element iron, along with additional minor amounts of bismuth, phosphorus, and molybdenum to modify the proportion of various elements from that existing in the original catalyst. Addition of these elements in the form of soluble salts or acids to the depleted catalyst, atfer thorough mixing, spray-drying, and calcination, does not yield a useable product.

It was expected that the addition of the silica dispersion to the catalyst, followed by a thorough ball-milling and subsequent addition of the various elements by evaporation from their soluble salts would result in an acceptable product. It does not. In some cases, the chemical activity is acceptable, but attrition resistance is poor. In other cases, the attrition resistance is acceptable, but the chemical activity is poor. In still other cases, in addition to one or the other of the above deficiencies, the surface area was also unacceptable.

Specifically, it must be realized that there is no helpful disclosure anywhere as to how to remanufacture a bismuth phosphomolybdate catalyst which has already been used or spent. The key step in the instant process is the intensive comminution of the spent or used catalyst to the submicron range, and the correct sequence of addition of constituents in the recipe.

SUMMARY OF THE INVENTION

It is an object of the instant invention to provide an iron-containing bismuth phosphomolybdate catalyst which is manufactured from used or spent bismuth phosphomolybdate catalyst, said iron-containing catalyst being particularly useful in the ammoxidation of propylene and isobutylene to acrylonitrile and methacrylonitrile, said catalyst having superior physical characteristics and chemical activity to that of the iron-free catalyst.

It is a further object of the instant invention to provide a process for incorporating an additional element into a spent or used bismuth phosphomolybdate catalyst.

PREFERRED EMBODIMENT OF THE INVENTION

It was unexpectedly discovered that thorough ball-milling of the used catalyst with water was the first and essential step. The amount of water is not critical; a preferred quantity is in the range of from 1:5 to 5:1 parts by weight of catalyst to water. A solution of ammonium heptamolybdate is then added to the ball-milled catalyst and thoroughly mixed. The quantity of ammonium heptamolybdate used depends on the amount of molybdenum to be incorporated in the remanufactured catalyst and is generally less in weight than the weight of spent catalyst, and more particularly about one-fourth (¼) as much. In a separate tank, a small quantity of phosphoric acid is added to and mixed with an aqueous dispersion of silica. The function of the phosphoric acid is essentially to acidify the silica dispersion in water. The amount used is generally small, in the range of less than 10 percent by weight of the spent catalyst charge. To this acidified silica dispersion is added the ball-milled mixture and thoroughly stirred.

In a separate vessel, ferric nitrate is melted and acidified with a small quantity of nitric acid. A preferred form of ferric nitrate is that with 9 moles of water of crystallization, namely $Fe(NO_3)_3 \cdot 9H_2O$. The amount of ferric nitrate used is determined by the desired ratio of iron to bismuth in the final catalyst. In general, the amount of ferric nitrate will be about one-half the amount by weight of the amount of spent catalyst charge. The hot solution is added to the silica contents of the tank. The mixture is stirred until a color change appears from mud brown to greyish green. The mixture is spray-dried and calcined in a conventional manner, described in U.S. Pat. No. 2,904,580.

The procedure described hereinabove yields a highly active, highly stable catalyst which gives per pass conversions to acrylonitrile in excess of 70 percent.

The foregoing description for remanufactured catalyst is particularly directed to spent, used or depleted catalyst, but is not necessarily limited thereto, since it would be obvious that a freshly prepared bismuth phosphomolybdate catalyst can also be remanufactured to incorporate iron by following the procedures outlined herein. At the same time, the attrition resistance of the catalyst is below 5 percent. The attrition resistance is measured by standard attrition resistance tests carried out as follows:

A small quantity of catalyst is placed in a vertical tube through which a constant air jet velocity may be maintained. Initially, the air jet removes fines which escape from the upper, open end of the tube. Means for collecting particles escaping from the upper, open end of the tube are provided. The test is started by introducing the air jet, and the quantity of fines collected at the end of a 5-hour period, and again at the end of a 20-hour period, are weighed. The overhead fines weighed at the end of the 5-hour period consist of both initial fines and fines due to attrition during the 5-hour period. The attrition resistance, indicated as percent attrition, is calculated as follows:

Percent attrition =

$$\frac{100 \times \text{grams overhead in 5 to 20 hr. period}}{50 \text{ grams initial charge} - \text{grams overhead in 5 hr. period}}$$

Table I sets forth a comparison of the attrition resistance and activity as measured as percent conversion to acrylonitrile of remanufactured catalysts prepared by various recipes, the compositions of the finished catalysts in each case being identical.

The following example describes the preparation of the remanufactured catalyst of the instant invention.

48 pounds of spent bismuth phosphomolybdate catalyst are placed in a ball mill. 6 gallons of water are added thereto, and the mixture is ball-milled for 15 hours. The mill is stopped, and a solution of ammonium heptamolybdate made up with 12.9 pounds ammonium heptamolybdate dissolved in 20 pounds water is added to the ball-milled mixture. The mill is closed and run for about 5 minutes to disperse the contents evenly. In a separate tank we place 52 pounds of Ludox® (a 30 percent dispersion of silica in water which is ammonia stabilized). To this is added 0.71 pounds of 85 percent phosphoric acid. The mixture is stirred. To this mixture is added the contents of the ball mill. In a separate vessel, acidified 22.2 pounds ferric nitrate ($Fe(NO_3)_3 \cdot 9H_2O$) with 1.5 pounds of 70 percent nitric acid is heated to about 60° C. so as to liquify the salt. Add the liquid to the contents of the tank and stir for about one-half hour until a color change from mud brown to greyish green occurs. The mixture is spray-dried with an inlet temperature of about 450° F. and an outlet temperature of 240° F. The product is microspheroidal. It is calcined at 1260° F. for one hour, after which it turns rust red.

TABLE I.—EFFECT OF ADDITION SEQUENCE ON A112 SLURRY

| Addition sequence | Activity | Attrition resistance | Surface area | Remarks |
|---|---|---|---|---|
| Cat A plus water<br>Nitrates<br>$H_3PO_4$<br>AHM*<br>Ludox HS 40 | Good | Unsatisfactory | Too low | Final slurry very lumpy; difficult to spray-dry. |
| Cat A plus water<br>AHM<br>Separately mix Ludox HS 40 and $H_3PO_4$.<br>Add slurry<br>Nitrates | Excellent | Excellent | Excellent | Very smooth, creamy slurry. Stable viscosity of about 8.** |
| Nitrates<br>AHM<br>$H_3PO_4$<br>Cat A plus water<br>Ludox HS 40 | Fair | Unsatisfactory | Poor | Very lumpy mixture; coarse precipitate upon AHM addition. Viscosity is unstable. |
| Ludox HS 40<br>$H_3PO_4$<br>AHM<br>Cat A plus water<br>Nitrates | do | Good | Unsatisfactory | No lumps initially, but small ones later. Viscosity of final mixture is too low. |
| Ludox HS 40<br>$H_3PO_4$<br>Cat A plus water<br>Nitrates<br>AHM | do | Poor | Poor | Small lumps. Viscosity too low in final mixture. |
| Cat A plus water<br>Ludox HS 40<br>$H_3PO_4$<br>AHM<br>Nitrates | Good | do | do | Ludox added gradually over 20 minute period. Final mixture very viscous (26.6).** |

\* Ammonium heptamolybdate.
\*\* Viscosity readings taken on a Brookfield viscometer, using a No. 3 spindle.

We claim:

1. In a process for the manufacture of an iron-containing catalyst from a bismuth phosphomolybdate catalyst on a catalyst carrier, the improvement consisting of, sequentially, comminuting said catalyst with sufficient water to form a paste, adding aqueous ammonium heptamolybdate solution to said paste to form a slurry, adding said slurry to a silica dispersion in water acidified with phosphoric acid, adding an iron salt in acidic solution to said slurry and homogeneously dispersing it therein to form a smooth mixture, spray-drying said mixture to form a microspheroidal product, and calcining said microspheroidal product at a temperature below that deleterious to the resulting iron-containing catalyst.

2. An iron-containing catalyst remanufactured from a used, spent or depleted bismuth phosphomolybdate catalyst on a catalyst carrier by
   (a) comminuting said used catalyst with water to form a paste,
   (b) adding an aqueous solution of ammonium heptamolybdate to said paste to form a slurry,
   (c) adding said slurry to an aqueous dispersion of silica acidified with phosphoric acid,
   (d) adding thereto an iron salt in acid solution, to form a homogeneous mixture,
   (e) drying and calcining said mixture at a temperature below the decomposition temperature of said catalyst.

References Cited
UNITED STATES PATENTS

| | | |
|---|---|---|
| 3,171,859 | 3/1965 | Sennewald et al. __ 252—437 UX |
| 3,200,141 | 8/1965 | Milberger _____ 252—437 X |
| 3,226,422 | 12/1965 | Sennewald et al. ___ 252—437 X |
| 3,264,347 | 8/1966 | Sennewald et al. ___ 252—437 X |

PATRICK P. GARVIN, Primary Examiner

U.S. Cl. X.R.

252—413; 260—465.3